US012606399B2

(12) United States Patent
Lee et al.

(10) Patent No.: US 12,606,399 B2
(45) Date of Patent: Apr. 21, 2026

(54) ELECTRODE DRIVING APPARATUS

(71) Applicant: LG ENERGY SOLUTION, LTD.,
Seoul (KR)

(72) Inventors: Kyoung Ho Lee, Daejeon (KR); **Min
Ki Kim, Daejeon (KR); Ryeon Ho
Kang, Daejeon (KR); Ki Sun Kwon**,
Daejeon (KR)

(73) Assignee: LG ENERGY SOLUTION, LTD.,
Seoul (KR)

( * ) Notice: Subject to any disclaimer, the term of this
patent is extended or adjusted under 35
U.S.C. 154(b) by 184 days.

(21) Appl. No.: 18/706,817

(22) PCT Filed: Dec. 19, 2022

(86) PCT No.: PCT/KR2022/020729
§ 371 (c)(1),
(2) Date: May 2, 2024

(87) PCT Pub. No.: WO2023/121185
PCT Pub. Date: Jun. 29, 2023

(65) Prior Publication Data
US 2025/0256933 A1     Aug. 14, 2025

(30) Foreign Application Priority Data

Dec. 20, 2021    (KR) ........................ 10-2021-0183212

(51) Int. Cl.
B65H 18/00         (2006.01)
B65H 18/10         (2006.01)
(Continued)

(52) U.S. Cl.
CPC ........... *B65H 18/103* (2013.01); *B65H 23/00*
(2013.01); *H01M 4/04* (2013.01); *B65H*
*2701/19* (2013.01)

(58) Field of Classification Search
CPC ...... B65H 18/103; B65H 23/00; B65H 23/26;
B65H 23/038; B65H 2301/415085; B65H
2403/52; H01M 4/04; H01M 10/0404
See application file for complete search history.

(56) References Cited

U.S. PATENT DOCUMENTS

2021/0043980 A1     2/2021   Wang et al.

FOREIGN PATENT DOCUMENTS

CN          107403963 A    11/2017
EP          3 675 269 A1    7/2020
(Continued)

OTHER PUBLICATIONS

Extended European Search Report for European Application No.
22911818.7, dated Mar. 31, 2025.
(Continued)

*Primary Examiner* — Emmanuel M Marcelo
(74) *Attorney, Agent, or Firm* — Birch, Stewart, Kolasch
& Birch, LLP

(57)          ABSTRACT

The electrode driving apparatus is for driving an electrode
that is coated with an active material, and includes a main
base, a sub base spaced apart from and parallel to the main
base, a shaft extending from the sub base toward the
opposite side to the main base, an electrode driving roller
that rotates about the shaft and is in contact with the
electrode, and a position adjuster that is located between the
main base and the sub base and regulates a gap between the
main base and the sub base.

10 Claims, 4 Drawing Sheets

(51) Int. Cl.
    *B65H 23/00*         (2006.01)
    *H01M 4/04*         (2006.01)

(56)            References Cited

FOREIGN PATENT DOCUMENTS

| | | | | | |
|---|---|---|---|---|---|
| GB | 2150502 | A | * | 7/1985 | .............. B41J 33/52 |
| JP | 2005-79079 | A | | 3/2005 | |
| KR | 10-0815521 | B1 | | 8/2008 | |
| KR | 10-2014-0009016 | A | | 1/2014 | |
| KR | 10-2014-0015190 | A | | 2/2014 | |
| KR | 10-1701390 | B1 | | 2/2017 | |
| KR | 10-1811201 | B1 | | 12/2017 | |
| KR | 20200088533 | A | * | 7/2020 | .......... H01M 4/0471 |
| KR | 10-2020-0104598 | A | | 9/2020 | |
| KR | 10-2190264 | B1 | | 12/2020 | |
| KR | 10-2192738 | B1 | | 12/2020 | |
| KR | 10-2019-0059210 | A | | 1/2026 | |
| KR | 10-2020-0088533 | A | | 1/2026 | |
| WO | WO 2009/019781 | A1 | | 2/2009 | |

OTHER PUBLICATIONS

International Search Repori (PCT/ISA/210) issued in PCT/KR2022/020729 mailed on Apr. 3, 2023.

* cited by examiner

ELECTRODE DRIVING APPARATUS

CROSS-REFERENCE TO RELATED APPLICATION

The present application claims the benefit of the priority of Korean Patent Application No. 10-2021-0183212, filed on Dec. 20, 2021, which is hereby incorporated by reference in its entirety.

TECHNICAL FIELD

The present invention relates to an electrode driving apparatus and, more particularly, to an electrode driving apparatus for driving an electrode that is used in the manufacture of a secondary battery.

BACKGROUND ART

Recently, the price of energy sources is increasing due to the depletion of fossil fuels, interest in environmental pollution is growing, and demands for eco-friendly alternative energy sources have become an indispensable factor for the future life. Accordingly, research on technologies for generating various powers, such as photovoltaic, wind, and tidal powers, is continuing, and power storage devices, such as batteries, for more efficiently using the generated electric energy are also drawing much attention.

Furthermore, as technical development and demands for electronic mobile devices and electric vehicles using batteries increase, demands for batteries as energy sources are rapidly increasing. Accordingly, lots of research on the batteries capable of coping with those various demands are being carried out.

Batteries for storing electric energy may be generally classified into primary batteries and secondary batteries. The primary batteries are disposable consumable batteries, but the secondary batteries are rechargeable batteries which are manufactured by using a material in which oxidation and reduction processes between an electric current and substances are repeatable. That is, when the reduction reaction to the material is performed by the electric current, power is recharged. Also, when the oxidation reaction to the material is performed, the power is discharged. Such recharging and discharging may be performed repeatedly to generate electricity.

In particular, in terms of materials, there are high demands for lithium secondary batteries, such as lithium ion batteries and lithium ion polymer batteries, having advantages such as the high energy density and discharge voltage and the output stability.

The secondary batteries are rechargeable unlike the primary batteries, and classified into coin-type batteries, cylindrical batteries, prismatic batteries, and pouch-type batteries depending on shapes of battery cases.

Each of the cylindrical secondary batteries includes an electrode assembly wound in a jell-roll shape, a case for accommodating therein the electrode assembly together with an electrolyte, and a cap assembly for sealing an opening of the case. Typically, the electrode assembly employed in the cylindrical secondary battery includes a positive electrode plate, a separator, and a negative electrode plate. The positive electrode plate includes a positive electrode coating portion, in which a positive electrode collector is coated with a positive electrode active material, and a positive electrode non-coating portion, which is not coated. Similarly, the negative electrode plate includes a negative electrode coating portion, in which a negative electrode active material is applied on a negative electrode collector, and a negative electrode non-coating portion, which is not coated. An electrode tab is installed in each of the positive electrode non-coating portion and the negative electrode non-coating portion. A porous separator is located between the positive electrode plate and the negative electrode plate. The separator insulates the positive electrode plate and the negative electrode plate from each other, while allowing active material ions to be exchanged between the electrode plates, thereby causing an electrochemical reaction. The positive electrode plate, the separator, and the negative electrode plate are sequentially stacked and wound, and thus, a jelly-roll type electrode assembly is manufactured.

Accordingly, an apparatus for driving an electrode is required to manufacture a jelly-roll type electrode assembly used in a cylindrical secondary battery or to inspect and additionally process an electrode used in a secondary battery.

An electrode driving apparatus may include rollers through which an electrode passes, but an electrode driving apparatus according to the related art has a structure in which all rollers through which an electrode passes are provided on a single plate. Therefore, when the width of an electrode is changed due to replacement of the electrode, each roller has to be replaced according to the width of the electrode, and the position of each roller on a shaft has to be individually adjusted.

This method takes a lot of response time for the replacement and deteriorates the efficiency of the entire process due to complicated work.

In order to solve the above limitation, there is a need for a method that can reduce the time consumed when the position of the roller needs to be corrected due to the change in width of the electrode and can simplify the work.

DISCLOSURE OF THE INVENTION

Technical Problem

The present invention has been made to solve the above limitation, and an objective of the present invention is to collectively adjust the positions of electrode driving rollers through which an electrode passes. Accordingly, the electrode driving rollers are easily moved or placed on the same line, and thus, the time required for rearrangement of the electrode driving rollers due to the change in the width of the electrode is reduced. In addition, the operation is simplified, and thus, the efficiency of the entire process is enhanced. In addition, an objective of the present invention is to provide an electrode driving apparatus capable of assisting in producing stable products by reducing meandering when supplying electrodes.

Technical Solution

An electrode driving apparatus according to the present invention is for driving an electrode that is coated with an active material, and the electrode driving apparatus includes a main base, a sub base spaced apart from and parallel to the main base, a shaft extending from the sub base toward the opposite side to the main base, an electrode driving roller that rotates about the shaft and is in contact with the electrode, and a position adjuster that is located between the main base and the sub base and regulates a gap between the main base and the sub base.

The electrode driving roller may be connected to the sub base and fixed in an axial direction while rotating about the shaft.

The electrode driving roller may include a large diameter portion and a small diameter portion having a smaller diameter than the large diameter portion, wherein a distance between the sub base and the large diameter portion is less than a distance between the sub base and the small diameter portion.

The electrode driving roller may further include a tapered portion which connects the large diameter portion and the small diameter portion to each other and decreases in diameter toward the small diameter portion.

The position adjuster may include a nut passing through the main base and a screw shaft which extends from the sub-base and passes through the nut and is fastened to the nut.

The electrode driving apparatus may further include a handle which passes through the sub base, is connected to the screw shaft, and rotates together with the screw shaft.

The electrode driving apparatus may further include a position indicator, which is located on an outer surface of the sub base and indicates a distance between the sub base and the main base, and a reference shaft, which extends from the main base to pass through the position indicator.

The electrode driving apparatus may further include a cap which is mounted to the shaft and located on an end of the shaft opposite the sub base with the electrode driving roller therebetween.

The electrode driving apparatus may further include a guide shaft which is connected to the main base, extends in a direction toward the sub base, passes through the sub base, and guides movement of the sub base.

The electrode driving apparatus may further include a servo motor which is connected to the position adjuster and regulates operation of the position adjuster.

Advantageous Effects

An electrode driving apparatus according to the present invention is for driving an electrode that is coated with an active material, and includes a main base, a sub base spaced apart from and parallel to the main base, a shaft extending from the sub base toward the opposite side to the main base, an electrode driving roller that rotates about the shaft and is in contact with the electrode, and a position adjuster that is located between the main base and the sub base and regulates a gap between the main base and the sub base.

Accordingly, when it is necessary to correct the positions of electrode driving rollers, through which an electrode passes, because the width of the electrode is changed due to a change in the type of electrode, etc., the positions of the electrode driving rollers are collectively adjusted. Therefore, the electrode driving rollers are easily moved or placed on the same line, and thus, the time and energy required for rearrangement of the electrode driving rollers due to the change in the width of the electrode may be reduced. In addition, the operation is simplified, and thus, the efficiency of the entire process may be enhanced. In addition, the electrode driving apparatus may assist in producing stable products by reducing meandering when supplying electrodes.

MODE FOR CARRYING OUT THE INVENTION

Figure 1:
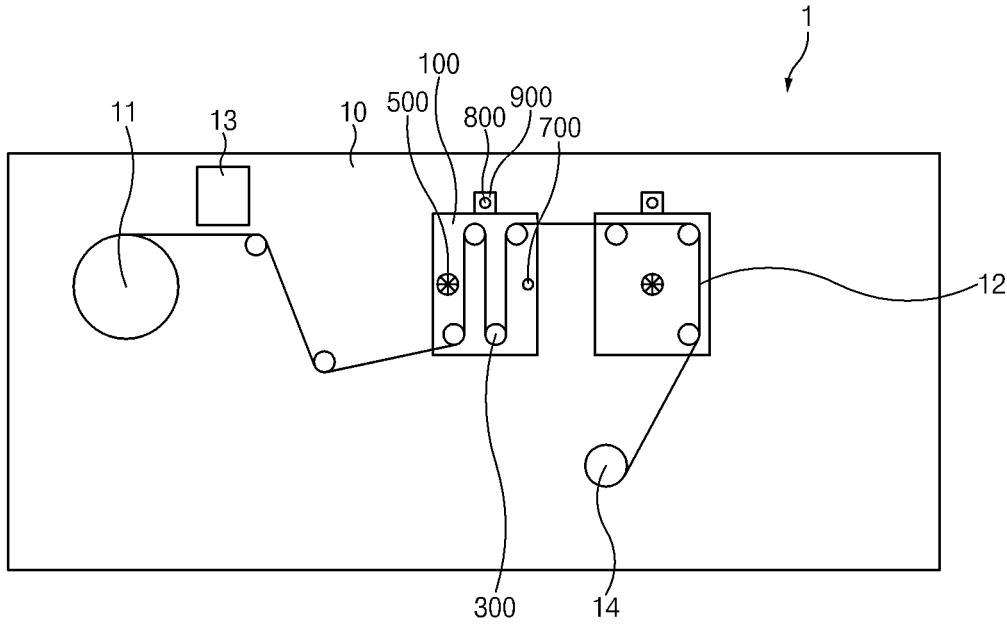
FIG. 1 is a front view schematically illustrating an electrode driving apparatus according to an embodiment of the present invention.

Hereinafter, embodiments of the present invention will be described in detail with reference to the accompanying drawings so as to be easily carried out by a person skilled in the art to which the present invention pertains. However, the present invention may be embodied in various different forms, and is neither limited nor restricted to the following embodiments.

In order to clearly describe the present invention, detailed description of parts irrelevant to the invention or detailed descriptions of related well-known technologies that may unnecessarily obscure subject matters of the invention will be omitted. In the specification, when reference numerals are given to components in each of the drawings, the same or similar components will be designated by the same or similar reference numerals throughout the specification.

Also, terms or words used in this specification and claims should not be restrictively interpreted as ordinary meanings or dictionary-based meanings, but should be interpreted as meanings and concepts conforming to the technical ideas of the present invention on the basis of the principle that an inventor can properly define the concept of a term so as to describe his or her invention in the best ways.

Figure 2:
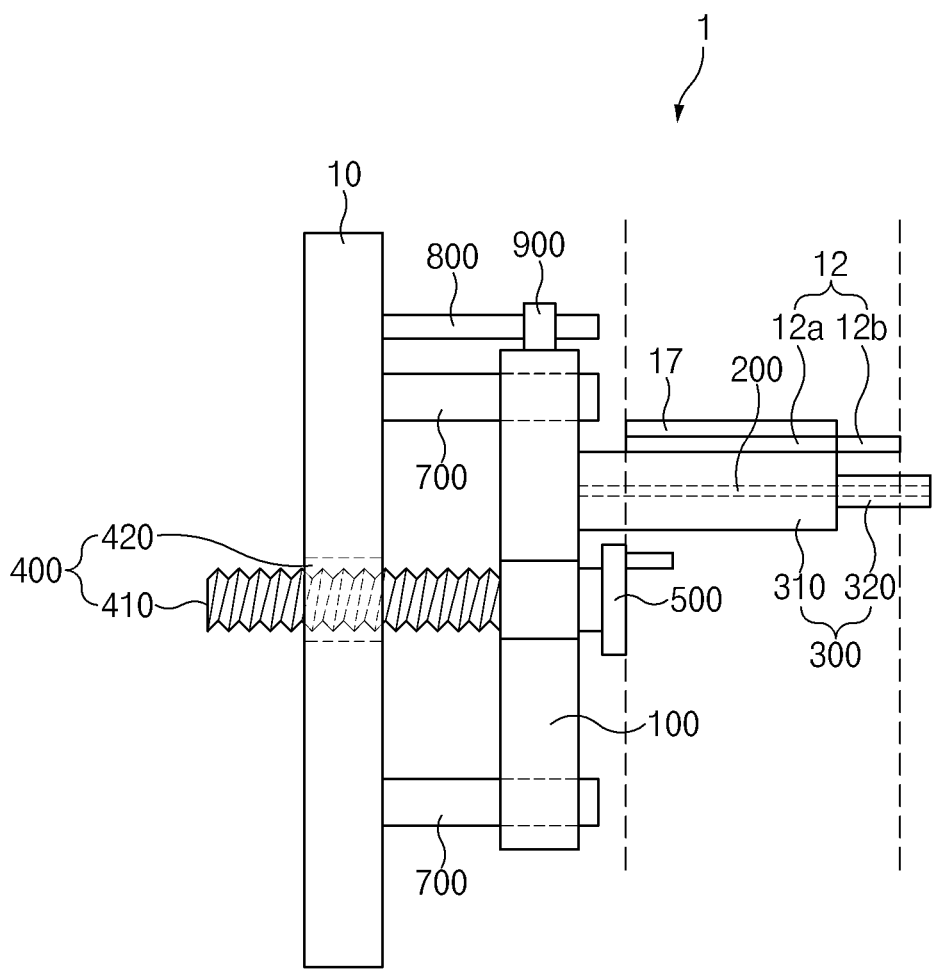
FIG. 2 is a side view schematically illustrating an electrode driving apparatus according to an embodiment of the present invention.

FIG. 1 is a front view schematically illustrating an electrode driving apparatus 1 according to an embodiment of the present invention, and FIG. 2 is a side view schematically illustrating the electrode driving apparatus 1 according to an embodiment of the present invention.

The electrode driving apparatus 1 according to an embodiment of the present invention may drive an electrode 12 of which a surface is partially coated with an active material 17. The electrode 12 is supplied from an electrode roll 11 on which the electrode 12 is wound in a roll-shape, and the supplied electrode 12 may be moved by rotation of electrode driving rollers 300 while being in contact with the electrode driving rollers 300. The electrode is wound onto take up roll 14.

Referring to FIGS. 1 and 2, the electrode driving apparatus 1 according to an embodiment of the present invention may include a main base 10, a sub base 100, a shaft 200, and an electrode driving roller 300, and a position adjuster 400.

The main base 10 is configured to be connected to several components of the electrode driving apparatus 1, and thus, the main base 10 may have a plate shape having a flat surface.

According to the related art, all components necessary for driving an electrode are provided on a main base 10. Therefore, it is difficult to control the components collectively. The electrode driving apparatus 1 according to an embodiment of the present invention to solve the above limitation may include a sub base 100 for collectively regulating certain components. The electrode driving apparatus 1 may include a plurality of sub bases 100 according to the type and number of components to be regulated.

The sub base 100 may be spaced apart from and parallel to the main base 10 and have a plate shape having a flat surface like the main base 10. Specifically, the sub base moves certain components from the surface of the main base 10 while being spaced apart from the main base 10, and thus, may have a plate shape having a smaller surface area than the main base 10.

The electrode driving apparatus 1 requires a shaft on which a roller for driving the electrode 12 is located and which can rotate the roller. As an example of such a shaft, the electrode driving apparatus 1 according to the present invention may include a shaft 200.

The shaft 200 may extend from the sub base 100 toward the opposite side to the main base 10. Since the electrode driving roller 300 has to rotate about the shaft 200, the shaft 200 may preferably have a cylindrical shape. However, the embodiment is not limited thereto.

As an example of a configuration for driving the electrode 12 by means of rotation, the electrode driving apparatus 1 according to the present invention may include an electrode driving roller 300. The electrode driving roller 300 may be connected to the shaft 200, and this connection may be made in a manner in which the shaft 200 passes through the center of the electrode driving roller 300. The electrode driving roller 300 connected in this manner may rotate about the shaft 200.

The electrode driving roller 300 may have a cylindrical shape to drive the electrode 12 while being in contact with the electrode 12. However, the embodiment is not limited thereto.

When the electrode driving apparatus 1 is operated, the electrode driving roller 300 may continuously rotate while the electrode 12 travels. Since the electrode 12 travels while being in contact with the surface, it may be necessary to limit the movement of the electrode driving roller 300 in an axial direction. As an example of a method of fixing the electrode driving roller 300 in the axial direction, the electrode driving roller 300 according to the present invention may be connected to the sub base 100 and fixed in the axial direction while rotating about the shaft 200.

Although fixed to the sub base 100, the electrode driving roller 300 has to be able to rotate about the shaft 200. Therefore, the electrode driving roller 300 may be connected to the sub base 100 using parts such as bearings. The method of connecting the electrode driving roller 300 to the sub base 100 using a bearing is merely an example. Accordingly, parts and methods for connection between the electrode driving roller 300 and the sub base 100 are not limited thereto, and other forms are also applicable.

The electrode 12 may travel in a state in which an active material 17 is applied on the surface thereof. The active material 17 may be partially applied on the surface of the electrode 12. A portion coated with the active material 17 may be a coating portion 12a, and a portion not coated with the active material 17 may be a non-coating portion 12b.

Since the non-coating portion 12b of the electrode 12 is additionally processed while the electrode 12 is driven by the electrode driving apparatus 1, a free space may be required between the electrode driving roller 300 and the non-coating portion 12b of the electrode 12. Therefore, the electrode driving roller 300 according to the present invention may include a large diameter portion 310 and a small diameter portion 320.

The small diameter portion 320 may have a smaller diameter than the large diameter portion 310, and a distance between the sub base 100 and the large diameter portion 310 may be less than a distance between the sub base 100 and the small diameter portion 320.

The outer circumference of the large diameter portion 310 may be in contact with the coating portion 12a of the electrode 12, and the outer circumference of the small diameter portion 320 may face the non-coating portion 12b of the electrode 12. Therefore, when the coating portion 12a of the electrode 12 travels in contact with the large diameter portion 310, a free space may be formed between the uncoated portion 12b of the electrode 12 and the small diameter portion 320. Accordingly, the non-coating portion 12b may be easily processed.

Accordingly, the large diameter portion 310 and the small diameter portion 320 may provide an effect of increasing the efficiency of additional operations such as processing required for the electrode 12.

The electrode driving apparatus 1 according to the present invention may further include a processing device 13 that is used for additional operations such as processing described above. This varies depending on the type of processing, and thus, a detailed description thereof will be omitted.

The electrode driving apparatus 1 according to an embodiment of the present invention may include a position adjuster 400 as an example of a configuration for collectively regulating components connected to the sub base 100.

The position adjuster 400 is located between the main base 10 and the sub base 100 and may regulate a gap between the main base 10 and the sub base 100. That is, in the electrode driving apparatus 1 according to the present invention, the electrode driving roller 300 may be moved along with the movement of the sub base 100. Therefore, when the electrode driving apparatus 1 is provided with a plurality of electrode driving rollers 300, even if the width of the electrode 12 is changed due to the change in the type of the electrode 12, the positions of the electrode driving rollers 300 may be collectively corrected by the movement of the sub base 100 using the position adjuster 400 without the need to replace or adjust each of the electrode driving rollers 300.

The position adjuster 400 may regulate the gap between the main base 10 and the sub base 100 by moving the sub base 100. Therefore, the position adjuster 400 may have a configuration in which the length of the position adjuster 400 itself may be regulated between the main base 10 and the sub base 100 or a configuration in which the gap is regulated while the position adjuster 400 moves through the main base 10 or the sub base 100.

When the plurality of sub bases 100 are provided in the electrode driving apparatus 1, the sub bases 100 may be respectively linked with different position adjusters 400.

Among examples of the configurations described above, as an example of the configuration in which the position adjuster 400 moves through the main base 10 and regulates the gap between the main base 10 and the sub base 100, the position adjuster 400 according to the present invention may have a configuration of a ball screw. Specifically, the position adjuster 400 may include a screw shaft 410 and a nut 420.

The screw shaft 410 may be fixed to the sub base 100 so as to be movable together with the sub base 100, and the nut 420 may be fixed to the main base 10. In more detail, the nut 420 having a spiral screw groove, which is formed on the inner circumferential surface, may pass through the main base 10, and the screw shaft 410 having a screw groove, which is formed on the outer circumferential surface and faces the screw groove of the nut 420, may extend and pass through the nut 420.

Accordingly, the screw grooves of the screw shaft 410 and the nut 420 are engaged with each other while the screw shaft 410 is rotated, and the screw shaft 410 may linearly move in the axial direction. The gap between the main base 10 and the sub base 100 may be regulated by the linear motion of the screw shaft 410 in the axial direction.

When the position adjuster 400 of the electrode driving apparatus 1 has the form of a ball screw that includes the screw shaft 410 and the nut 420, the gap between the main base 10 and the sub base 100 may be intuitively and easily regulated.

When the position adjuster 400 has the form of a ball screw and the gap between the main base 10 and the sub base 100 is regulated while the screw shaft 410 rotates, a component for easily rotating the screw shaft 410 may be required. As an example of the component, the electrode driving apparatus 1 according to an embodiment of the present invention may further include a handle 500.

The handle 500 may pass through the sub base 100 and be connected to the screw shaft 410. Accordingly, when the handle 500 is rotated, the screw shaft 410 may be rotated together. Also, as the screw shaft 410 is rotated, the screw shaft 410 and the nut 420 may be fastened to each other. That is, the handle 500 may regulate the linear motion of the screw shaft 410 by means of the rotation, and further regulate the gap between the main base 10 and the sub base 100.

The handle 500 may have a circular cross-section to facilitate rotation, and further include a structure such as a knob. The handle 500 may have a shape generally used in vehicles or mechanical devices.

When the electrode driving apparatus 1 includes the handle 500 connected to the screw shaft 410, the screw shaft 410 may be easily rotated. Accordingly, there is an effect in that the position of the sub base 100 may be conveniently and easily corrected.

When the gap between the main base 10 and the sub base 100 is regulated by the position adjuster 400, if the position of the sub base 100 or the distance between the main base 10 and the sub base 100 are known, the position adjuster 400 may be used efficiently. Therefore, as an example of a configuration for efficiently using the position adjuster 400, the electrode driving apparatus 1 according to an embodiment of the present invention may further include a reference shaft 800 and a position indicator 900.

The position indicator 900 may indicate the distance between the main base 10 and the sub base 100. For example, the position indicator 900 may indicate the position of the sub base 100 using the main base 10 as a reference point. The numerical value for the distance indicated by the position indicator 900 may be shown electronically or in the form of gradations, and this may vary depending on the type of the position indicator 900 used.

The position indicator 900 may be located on the outer surface of the sub base 100 so as to move along with the movement of the sub base 100. Preferably, the position indicator 900 may be located on the upper surface of the sub base 100 so that an operator can easily check the position indicator 900 when the gap between the main base 10 and the sub base 100 is regulated.

The reference shaft 800 may be connected to the main base 10 and extend from the main base 10 to pass through the position indicator 900. Therefore, the position indicator 900 may move in the axial direction of the reference shaft 800.

Since the reference shaft 800 extends to pass through the position indicator 900, the horizontal cross-section of the reference shaft 800 may have the same shape as the cross-section of a space formed in the position indicator 900. The reference shaft 800 may have a cylindrical shape so that the position indicator 900 may be easily moved, but the embodiment is not necessarily limited thereto.

When the operator can check the distance between the main base 10 and the sub base 100 by means of the position indicator 900, the process of regulating the position of the sub base 100 may be efficiently performed. In addition, the position values of the sub base 100 according to the types or widths of electrodes 12 are accumulated, and thus, usable data may be formed.

As an example of a configuration for connecting the main base 10 and the sub base 100 to each other in addition to the position adjuster 400, an embodiment of the present invention may further include a guide shaft 700.

The guide shaft 700 may be connected to the main base 10, extend in a direction toward the sub base 100, and pass through the sub base 100. Since the guide shaft 700 passes through the sub base 100, the sub base 100 may be in contact with the outer circumferential surface of the guide shaft 700 and move in the axial direction of the guide shaft 700.

The guide shaft 700 has to guide the constant movement of the sub base 100. Accordingly, when a plurality of guide shafts 700 passing through a single sub base 100 are provided, these guide shafts may be arranged in parallel to each other. In addition, the guide shaft may be positioned in parallel to the screw shaft 410 when arranged together with the screw shaft 410 described above.

The guide shaft 700 may be formed in a cylindrical shape, but the embodiment is not necessarily limited thereto.

The guide shaft 700 may share the load of the sub base 100 supported by the position adjuster 400 and assist the movement of the sub base 100. Through this, it is possible to enhance the stability of the entire electrode driving apparatus 1.

Figure 3:
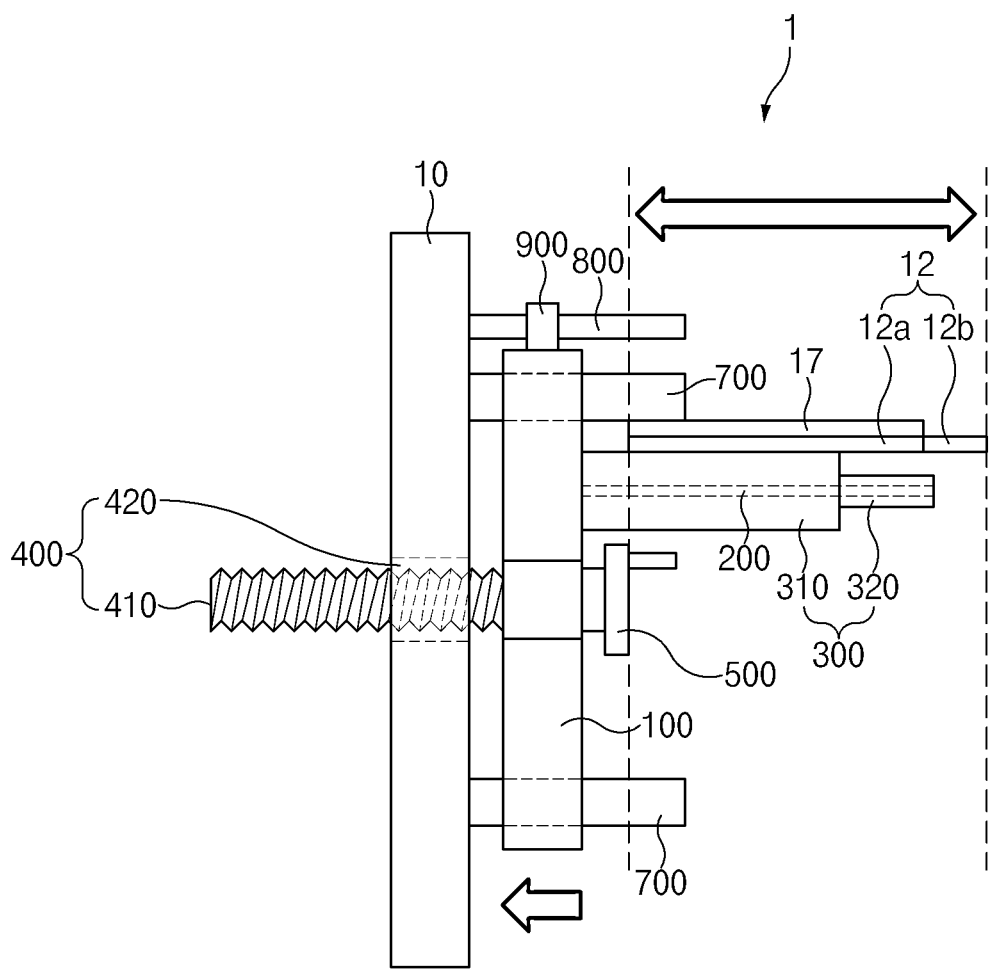
FIG. 3 is a side view schematically illustrating a case in which the width of an electrode driven by an electrode driving apparatus according to an embodiment of the present invention is increased.

FIG. 3 is a side view schematically illustrating a case in which the width of the electrode 12 driven by the electrode driving apparatus 1 according to an embodiment of the present invention is increased.

One of the objectives of the present invention is to collectively correct the positions of the electrode driving rollers 300 when conditions, such as the types of the electrode 12 or the widths of the electrode 12, are changed. A configuration for collectively correcting the electrode driving rollers 300 may be described through an example in which the width of the electrode 12 is increased.

Comparing FIGS. 2 and 3 with each other, when the width of an electrode 12 is increased compared to the electrode 12 used in the previous process, the electrode driving roller 300 may be moved in the direction toward the main base 10.

Specifically, the sub base 100 and the electrode driving roller 300 may be moved so that the position of the end of the non-coating portion 12b of the previously used electrode 12 coincides with the position of the end of a non-coating portion 12b of the replaced electrode 12. While the electrode 12 travels in the electrode driving apparatus 1, a tab formed on the non-coating portion 12b of the electrode 12 may be processed. The electrode driving roller 300 may be moved on the basis of the end of the non-coating portion 12b of the electrode 12 in order to maintain the same position at which the tab is processed. On the other hand, when the width of the electrode 12 decreases, the electrode driving roller 300 may be moved in a direction away from the main base 10. This is merely one example, and the moving direction of the electrode driving roller 300 according to the change of the electrode 12 is not necessarily limited thereto.

Figure 4:
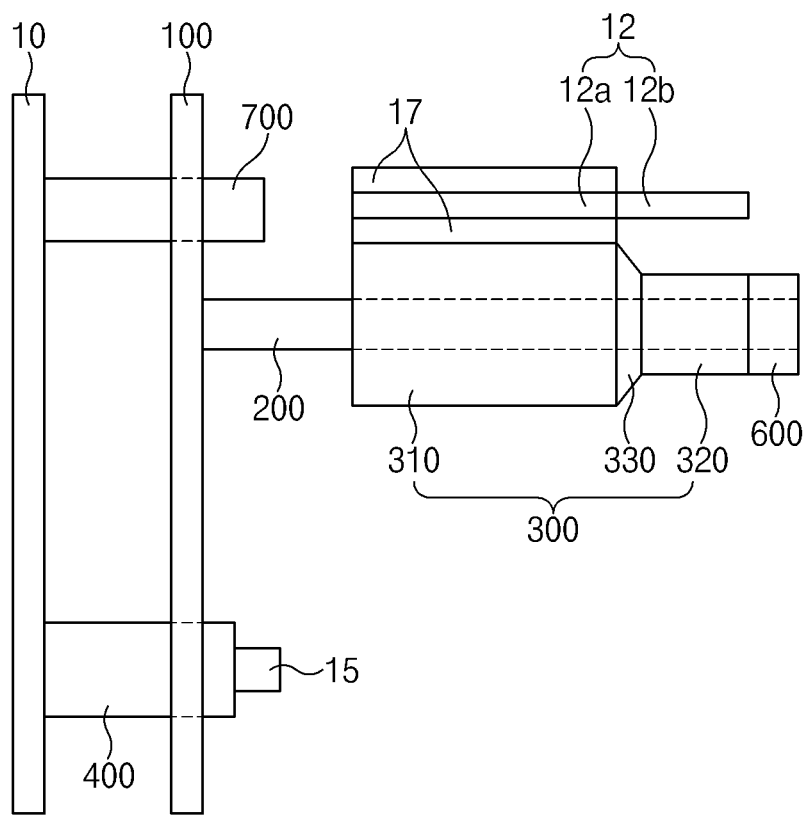
FIG. 4 is a side view schematically illustrating an electrode driving apparatus according to another embodiment of the present invention.

FIG. 4 is a side view schematically illustrating an electrode driving apparatus 1 according to another embodiment of the present invention.

Hereinafter, a detailed description of the same configuration as that of the electrode driving apparatus 1 according to the embodiment of the present invention is omitted.

Referring to FIG. 4, an electrode driving roller 300 of the electrode driving apparatus 1 according to the present invention may further include a tapered portion 330 which connects the large diameter portion 310 and the small diameter portion 320 to each other and has a shape decreasing in diameter as approaching the small diameter portion 320. The tapered portion 330 may be formed in a diagonal shape when the electrode driving apparatus 1 is viewed from the side, or may be formed in a curved shape.

When the tapered portion 330 is formed between the large diameter portion 310 and the small diameter portion 320, there is an effect in that physical damage occurring on the surface of the electrode 12 in contact with the electrode driving roller 300 may be reduced.

As an example of a configuration for blocking the end of a shaft 200 that is not connected to the sub base 100, the electrode driving apparatus 1 according to the present embodiment may further include a cap 600.

The cap 600 is mounted to the shaft 200 and may be located on the opposite side from the sub base 100 with the electrode driving roller 300 therebetween.

The cap 600 may have a cylindrical shape, in which a space through which the shaft 200 passes is formed inside the center, and may have the diameter equal to the diameter of the small diameter portion 320.

When the electrode driving roller 300 is not connected to the sub base 100, the electrode driving roller 300 may be fixed by the cap 600 so as not to move in an axial direction. In addition, the end of the shaft 200 is blocked, and thus, interference with the shaft 200 may be reduced during the process.

The electrode driving apparatus 1 may automate the regulation of the gap between the main base 10 and the sub base 100 using the position adjuster 400. As an example of a configuration for automation, the electrode driving apparatus 1 according to the present embodiment may further include a servo motor 15.

The servo motor 15 may be connected to the position adjuster 400 and regulate operation of the position adjuster 400. Here, the position values of the sub base 100 according to the types or widths of electrodes 12, which are accumulated by a position indicator 900 described above, may be provided to the servo motor 15 as usable data.

The electrode driving apparatus 1 according to the present embodiment may further include a control device for automating the operation of the position adjuster 400, and a programmable logic controller (PLC) or the like may be used as the control device. This is merely one example, and other components required for automation may be added.

The electrode driving apparatus 1 according to the present invention may further include additional components necessary for processes performed while the electrode 12 travels. For example, components, such as a buffer device for regulating a traveling speed of the electrode 12 and a vision device for inspecting the surface of the electrode 12, may be further included.

When it is necessary to correct the positions of the electrode driving rollers 300, through which the electrode 12 passes, due to the occurrence of changes, such as the types of electrode 12 and the widths of the electrode 12, the electrode driving apparatus 1 according to the present invention may collectively adjust the positions of the electrode driving rollers 300. Accordingly, the time and energy required for rearrangement of the electrode driving rollers 300 may be reduced. In addition, the operation is simplified, and thus, the efficiency of the entire process may be enhanced.

Although the present invention is described by specific embodiments and drawings, the present invention is not limited thereto, and various changes and modifications may be made by a person skilled in the art to which the present invention pertains within the technical idea of the present invention and equivalent scope of the appended claims.

DESCRIPTION OF THE SYMBOLS

1: Electrode driving apparatus
10: Main base
11: Electrode roll
12: Electrode
12a: Coating portion
12b: Non-coating portion
13: Processing device
14: Winding device
15: Servo motor
17: Active material
100: Sub base
200: Shaft
300: Electrode driving roller
310: Large diameter portion
320: Small diameter portion
330: Tapered portion
400: Position adjuster
410: Screw shaft
420: Nut
500: Handle
600: Cap
700: Guide shaft
800: Reference shaft
900: Position indicator

The invention claimed is:

1. An electrode driving apparatus for driving an electrode that is coated with an active material, the electrode driving apparatus comprising:
   a main base;
   a sub base spaced apart from the main base;
   a shaft extending from the sub base in a direction away from the main base;
   an electrode driving roller that rotates about the shaft and is in contact with the electrode; and
   a position adjuster that is located between the main base and the sub base and regulates a gap between the main base and the sub base.

2. The electrode driving apparatus of claim 1, wherein the electrode driving roller is connected to the sub base and fixed in an axial direction while rotating about the shaft.

3. The electrode driving apparatus of claim 1, wherein the electrode driving roller comprises:
   a large diameter portion; and
   a small diameter portion having a smaller diameter than the large diameter portion, wherein a distance between the sub base and the large diameter portion is less than a distance between the sub base and the small diameter portion.

4. The electrode driving apparatus of claim 3, wherein the electrode driving roller further comprises a tapered portion which connects the large diameter portion and the small diameter portion to each other and decreases in diameter toward the small diameter portion.

5. The electrode driving apparatus of claim 1, wherein the position adjuster comprises:

a nut passing through the main base; and a screw shaft which extends from the sub-base and passes through the nut and is fastened to the nut.

6. The electrode driving apparatus of claim 5, further comprising a handle which passes through the sub base, is connected to the screw shaft, and rotates together with the screw shaft.

7. The electrode driving apparatus of claim 1, further comprising:

a position indicator which is located on an outer surface of the sub base and indicates a distance between the sub base and the main base; and a reference shaft which extends from the main base to pass through the position indicator.

8. The electrode driving apparatus of claim 1, further comprising a cap which is mounted to the shaft and located on an end of the shaft opposite the sub base with the electrode driving roller therebetween.

9. The electrode driving apparatus of claim 1, further comprising a guide shaft which is connected to the main base, extends in a direction toward the sub base, passes through the sub base, and guides movement of the sub base.

10. The electrode driving apparatus of claim 1, further comprising a servo motor which is connected to the position adjuster and regulates operation of the position adjuster.

* * * * *